United States Patent [19]

Birchall et al.

[11] 4,353,746

[45] Oct. 12, 1982

[54] HYDRAULIC CEMENT COMPOSITION

[75] Inventors: James D. Birchall, Mouldsworth; Kevin Kendall, Runcorn; Anthony J. Howard, Warrington, all of England

[73] Assignee: Imperial Chemical Industries Limited, London, England

[21] Appl. No.: 160,368

[22] Filed: Jun. 17, 1980

[30] Foreign Application Priority Data

Dec. 3, 1979 [GB] United Kingdom .................. 7941587

[51] Int. Cl.³ .............................................. C04B 7/02
[52] U.S. Cl. ...................................... 106/89; 106/102; 106/104; 106/110
[58] Field of Search .................. 106/89, 102, 104, 110

[56] References Cited

U.S. PATENT DOCUMENTS 4,032,353  6/1977  Ball et al. .............................. 106/97

FOREIGN PATENT DOCUMENTS 1219841  6/1966  Fed. Rep. of Germany ...... 106/102
1403993  5/1965  France ................................. 106/102
 292914  5/1971  U.S.S.R. .............................. 106/102

*Primary Examiner*—James Poer
*Attorney, Agent, or Firm*—Cushman, Darby & Cushman

[57] ABSTRACT

A hydraulic cement characterized by the particle size distribution of the hydraulic cement being multi-modal, preferably bimodal or trimodal, and in which preferably there are present two or more distinct bands or modes of particle sizes and in which the total weight of particles of intermediate size does not exceed 20% of the total weight of the particles in the bands or modes adjacent thereto, and a cement composition comprising the hydraulic cement and not greater than 25% of water by weight of the hydraulic cement.

16 Claims, No Drawings

HYDRAULIC CEMENT COMPOSITION

This invention relates to a hydraulic cement and to a cement composition containing the said hydraulic cement and water.

In making cementitious products from a hydraulic cement composition it is highly desirable to achieve a product of high strength, especially, high flexural strength.

The strengths of cementitious products produced by setting of such cement compositions are generally quite low, and in particular the flexural strengths of such cementitious products are low. Thus, where the cement composition comprises a hydraulic cement of conventional particle size range and an amount of water which is conventionally used in such compositions the flexural strength of the product produced by setting of the composition may be as low as 5 to 10 MPa.

The flexural strengths of cementitious products may be improved by including a reinforcing material in the composition from which the product is produced, for example fibrous reinforcement, for example as described by D. J. Hannant in Fibre Cements and Concretes, (Wiley, London 1978). Suitable fibrous materials may be, for example, metal or asbestos.

It has also been proposed in U.K. Specification Nos. 44369/75, 44836/75 (and in the corresponding published Belgian Pat. No. 847763) to improve the properties of cementitious products made from hydraulic cements by incorporating a water-dispersible polymer in a cement/water composition, while keeping the proportion of water low (up to 28% by weight of the hydraulic cement). Examples of polymers mentioned for this purpose include cellulose ethers, for example hydroxypropyl methyl cellulose, and polyacrylamides, such polymers being added in proportions up to 25% by weight of the hydraulic cement. Although this procedure does give an improvement in that flexural strengths of the cementitious product in excess of 15 MPa, preferably 20 MPa and more preferably 30 MPa are disclosed, it would still be desirable to be able to produce cementitious products having even greater flexural strengths, for example greater than 35 MPa, and preferably greater than 40 MPa.

Surprisingly, we have now found that it is possible to obtain such cementitious products of high flexural strengths by modifying the particle size distribution of the hydraulic cement used and preferably by lowering still further the proportion of water used in the composition. Furthermore, the obtainment of high flexural strengths in the cementitious products does not depend on the use of reinforcement, for example fibrous reinforcement, although we do not exclude the use of such reinforcement.

Conventional particulate hydraulic cements are usually obtained by comminution of initial coarse material to fine powders which have very variable particle size distributions. Even so, all commercially available hydraulic cements have in common the fact that the particle size distribution extends over a wide and substantially continuous band of particle sizes, for example from submicron to about 150 microns. Different cements vary from one to another in the distribution of sizes and the extent of the size distribution, but even so they have in common this substantially continuous type of distribution. It is believed that the poor flexural strengths of the set cementitious products made from the commercially available hydraulic cements result, at least in part, from this substantially continuous particle size distribution in the hydraulic cement and is related to the particular nature of the porosity of the products.

An aim of this invention is to improve the strength of cementitious products produced by setting of hydraulic cement compositions by means which modify the nature of the porosity of the products.

It has now been found that the use of a multi-modal distribution of particle sizes in the particulate hydraulic cement used leads to a modification of the nature of the porosity in the cementitious products produced therefrom and improves the strengths of the products to a remarkable extent, and in particular improves the flexural strengths.

According to the present invention there is provided a hydraulic cement characterised by the particle size distribution of the hydraulic cement being multi-modal (as hereinafter defined).

By the term "multi-modal" we mean a pattern of size distribution in which there are two or more distinct bands or modes of particle sizes present, the intermediate particle sizes between adjacent main bands or modes being present only in a substantially reduced proportion, so that the overall size distribution is no longer substantially continuous.

These intermediate particle sizes need not be eliminated completely, and it is sufficient that the total weight of the particles of intermediate size should not exceed about 20% of the total weight of those particles in the adjacent main bands or modes.

The multi-modal distribution is preferably bi-modal, but may with advantage be tri-modal.

The number of modes may be even greater, for example four, though the advantage in doing this may not be economically sufficient to justify the additional cost and effort involved.

In quantitative terms some examples of the desired particle size distributions of the hydraulic cement powders according to the invention are as follows, for bimodal distribution.

As a first general guide it is preferred that the ratio of the weight average mean particle sizes of particles in their respective bands or modes should be as widely separated as practicable, since this assists in achieving improved properties in the cementitious products made from the hydraulic cement. Thus, if the weight average mean particle size of the coarser mode or band is defined as D1 and the weight average mean particle size of the finer mode or band is defined as D2, the ratio D1:D2 is preferably at least 2, more preferably at least 10, and even more preferably in the range 20 to 40.

As a second guide it is found to be desirable to have the range of particle sizes in each mode or band narrow rather than wide. It is therefore preferred that these ranges for the bands be as narrow as is technically and economically practicable. A particularly useful range of compositions, of bimodal distribution, may be specified as those comprising hydraulic cement particles of the following sizes, (a) at least 50% and preferably 70% to 90% by weight of particles of particle size in the range 60 to 110 microns, and (b) at least 5% and preferably 10% to 30% by weight of particles of particle size in the range 1 to 10 microns, and (c) not greater than 20%, preferably no greater than 10%, and still more preferably no greater than 5%, by weight of particles of particle size outside the two ranges (a) and (b) above.

Improvements can be obtained by using a narrower band of particle sizes in the fractions (a) and (b) above, for example a range extending over about 20 to 25 microns in fraction (a), for example from 70 to 90 microns, and/or a range extending over about 5 microns in fraction (b), for example from 4 to 8 microns.

By applying the first and second general guides, it is practicable to define useful compositions outside those specifically comprising fractions (a), (b) and (c) as hereinbefore defined. Even so, it is believed that the optimum composition will depend to some extent upon the particular hydraulic cement or cements employed, the economics and practicability of achieving the desired size gradation and separations, and how closely the user desires to approach the maximum strength for the set cementitious product.

For trimodal distributions, very similar guidelines apply. If the weight average mean particle sizes of the three modes, coarse, intermediate, and fine respectively, are D1, D2 and D3 then it is preferred that the ratios D1:D2 and D2:D3 should each satisfy the ratio requirements specified above for D1:D2 in a bimodal distribution. In a tri-modal distribution, of course, it may not be practicable for both D1:D2 and D2:D3 to be the same, and so they may each differ considerably from one another but still be within one or other of the preferences. The preference for fractions having narrow bands of size in a bimodal distribution is likewise preferred in the case of a trimodal distribution.

A particularly useful range of compositions of trimodal distribution may be specified as those comprising particles of the following sizes:

(a) at least 50%, and preferably 70% to 90% by weight, of particles of particle size in the range 100 to 150 microns, (b) at least 5%, and preferably 10% to 30% by weight, of particles of particle size in the range 7 to 12 microns, and (c) at least 1%, and preferably 3% to 8% by weight, of particles of particle size in the range 0.5 to 2 microns.

By the term "hydraulic cement" we mean any material which sets and hardens by the addition of water, and which thus sets and hardens in the presence of water.

The hydraulic cement may be a silicate (siliceous) cement, for example Portland cement. If desired it may be an aluminate (aluminous) cement, for example a calcium aluminate cement, or a calcium sulphate hemihydrate ("Plaster of Paris") cement.

Mixtures of two or more different hydraulic cements may be used if desired.

Thus one possible bimodal mixture would comprise two different hydraulic cements, one having one of the selected particle size bands and the other having a different particle size band so that together they provide the desired bi-modal distribution.

The multi-modal distribution of particulate hydraulic cement may be achieved by modifying the comminution of the raw cement particles and using appropriate classifying, separating or mixing procedures. For example, the finely powdered cement normally produced may be classified, whether by sieving or any other convenient means, into portions of selected size range distributions, and then these fractions may be mixed in selected proportions with each other and/or with some of the original unclassified material so as to achieve the multi-modal distribution in the final mixture.

The strength of the cementitious product produced from the hydraulic cement is dependent inter alia on the proportion of water used in admixture with the hydraulic cement in the cement composition. It has also been found, surprisingly, that the multi-modal distribution of the cement particle sizes described above enables the proportion of water which is used to be considerably reduced while still retaining sufficient plasticity for the water-containing hydraulic cement composition to be shaped satisfactorily.

Thus, according to the invention there is also provided a hydraulic cement composition comprising a particulate hydraulic cement of multi-modal particle size distribution, as hereinbefore described, in admixture with a proportion of water sufficient to render the composition plastically deformable, the amount of water being not greater than 25 percent by weight of the particulate hydraulic cement.

The optimum proportion of water may vary according to the particular hydraulic cement used and the particular degree of deformability of the composition desired, but it is usually in the range 7% to 15% by weight of the dry particulate hydraulic cement. Preferably, the particle size distribution of the hydraulic cement is chosen so as to enable a suitably deformable cement composition containing a water proportion in the range 8% to 15% by weight of the cement to be produced. These proportions of water are markedly lower than those generally used in the prior art.

As the composition contains particularly low proportions of water it is preferred to include in the composition one or more processing additives which facilitates the mixing of hydraulic cement and water.

Such additives may be, for example, (a) a polymer having a lubricating action on the cement particles, or (b) an additive having a dispersing action on the particles, for example a surfactant.

Examples of such additives include, (i) cellulose ethers, for example hydroxypropyl methyl cellulose, (ii) amide-substituted polymers, for example a polymer or copolymer of acrylamide, (iii) polyalkylene oxide derivatives which may be for example a polyalkylene oxide (alternatively described as a polyalkylene glycol), for example polyalkylene glycols of molecular weight above about 10,000, or polyalkoxy derivatives of alcohols, phenols, or the like, (iv) sulphonated materials of the kind known in the art for imparting plasticising properties, for example lignosulphonates and sulphonated naphthalene salts.

The processing additive may be used, for example, in a proportion of 0.5 to 10% by weight of the hydraulic cement in the composition.

Mixtures of two or more such processing additives may be used if desired.

The hydraulic cement composition of the invention may contain, in addition to the cement, water and optional processing additive, other materials known in the art, for example fillers and/or aggregates conventional in the art, dispersing aids, setting modifiers, e.g. gypsum, and materials which increase fracture toughness, for example fibrous and/or rubbery materials.

The particle size of such other materials may vary considerably, but a useful form of the invention is that in which the mixture is trimodal in particle size distribution, with one of the three modes or bands being made up of aggregate particles and two modes or bands of cement particles. The aggregate mode or band may be any of the three modes or bands.

Useful fillers/aggregates for this purpose include various forms of silica, for example sand, quartz sand, and fine amorphous silica, e.g. fumed silica, olivine, titania, for example pigment grades of titania, slate powder, and mixtures thereof.

The cement composition may be made by mixing water with the hydraulic cement or with a mixture of the hydraulic cement and any other materials required to be present. Where the composition is to contain a processing additive the additive is preferably used in the form of an aqueous solution or dispersion of the additive. For example, an aqueous solution or dispersion of the processing additive may be mixed with the hydraulic cement or with a mixture of the hydraulic cement and water.

Where high strength cementitious products are required it is particularly desirable that the cement composition be thoroughly mixed, and it is preferred that the composition be mixed under conditions of high shear. For example, the composition may be mixed on a Banbury mixer or in a screw extruder. However, the composition is preferably mixed under conditions of high shear on a twin-roll mill by passing the composition repeatedly through the nip between the rolls of the mill, this procedure producing a thoroughly well mixed composition.

The hydraulic cement composition may be shaped or otherwise formed easily and conveniently by use of relatively low pressures, although we do not exclude the use of high pressures. If desired the composition may be shaped by, for example, extrusion or shaping in a press, e.g. in a hydraulic press.

It may be of advantage, and indeed it is preferred, in order to assist the control of the porosity characteristics of the cementitious product, to effect the setting of the composition under an applied pressure and to release the pressure not before the setting has proceeded at least to the extent that the composition does not relax on release of the pressure, that is does not change substantially in dimensions on release of pressure. The applied pressure need only be low, for example, up to 5 MPa. The time for which the pressure may be applied will depend inter alia on the nature of the hydraulic cement and on the temperature and humidity employed in the setting process, as may be determined by experiment.

The setting of the hydraulic cement composition may be effected at ambient temperature although setting may be assisted by use of elevated temperatures.

The setting is also desirably effected in a humid atmosphere, e.g. in an atmosphere of substantially 100% relative humidity.

Thus, the setting of the hydraulic cement composition may be achieved in conventional manner, for example by maintenance in a humid atmosphere, preferably of relative humidity at or near 100%, for a period of 0.5 to 28 days. An alternative method is to maintain the composition at elevated temperature and pressure and high humidity, to accelerate setting of the composition.

Cementitious products produced by setting of the cement compositions of the invention have high strength, particularly high flexural strength. The products may have a flexural strengths in excess of 40 MPa, and often in excess of 50 MPa as measured by a three point bend test on an Instron machine.

Flexural strengths of this order are substantially in excess of those obtained with conventional hydraulic cement compositions in the absence of reinforcement, for example fibrous reinforcement.

The cementitious products produced from the hydraulic cement compositions of the invention have porosity characteristics similar to those described in our copending British Patent Application No. 7,922,208, filed June 26, 1979. Thus, the cementitious product produced from the hydraulic cement composition may possess the following properties.

(i) The cementitious product may comprise not more than 2%, based on the total volume of the product, of pores having a maximum dimension exceeding 15 microns. The proportion of such pores is that determined by the absolute method of quantitative microscopy in which a surface of a sample of the cementitious product is polished to produce a plane surface on the sample, the sample is washed to remove the polishing debris from the surface, and the surface is illuminated to ensure that the holes in the surface are contrasted with the plane parts of the surface, and the surface is viewed by means of an optical microscope, typically at a magnification of ×100, or optionally by an electron microscope, and the holes exceeding 15 microns in size are determined, as described in "Quantitative Microscopy" by De Hoff and Rhines, McGraw Hill 1968. Sufficient area of the surface of the sample is viewed to reduce the statistical error, and usually 1000 holes are counted. The sample is then subjected to further polishing in order to expose another surface and the optical or electron microscopic examination is repeated. In general ten such surfaces are examined. The total volume, including pores, of the cementitious product may be measured, for example, by use of a mercury displacement technique, or by measurement of the external dimensions of the cementitious product.

(ii) The pore size distribution in the cementitious product may be substantially uniform throughout the product.

(iii) The porosity of the cementitious product, that is the total volume of the pores in the product as a proportion of the total volume of the product, including the pores, is generally not greater than 20%, and may be as low as 15% or even 10%. The porosity may be estimated by using the technique of helium comparison pyknometry to measure the volume of the material in the product and the technique of mercury displacement or measurement of the external dimensions of the product to estimate the total volume of the product, including pores.

(iv) In general in the product less than 5%, and often less than 2% of the total volume comprises pores in the size range 2 to 15 microns, as determined by quantitative microscopy.

The invention is now illustrated by the following Examples:

EXAMPLE 1

Ordinary Portland Cement powder was separated into fractions of different particle size, and two fractions were selected as follows:

Fraction 1:
  Comprising material which passes through a sieve of 125 microns hole size but does not pass through a sieve of 76 microns hole size.

Fraction 2:
  Comprising material of particle size below 10 microns, using an "Alpine" 100 MZR particle classifier. (This material was found to be substantially all of particle size in the range 1 micron to 10 microns, with a peak at 5 microns).

A dry mixture was made by mixing 80 grams of Fraction 1 with 20 grams of Fraction 2, by vigorous stirring to obtain intimate mixing. This mixture was then added at a steady rate to 13.3 grams of an aqueous polyacrylamide gel (20% of polyacrylamide "Cyanamer P.250" by weight, supplied by Allied Colloids, dissolved in water) on a twin-roll mill. After thorough mixing on the mill the dough was sandwiched between sheets of poly(ethylene terephthalate) and pressed into a sheet of thickness 3 mm on a hydraulic press at a pressure of 5 MPa. The sheet was allowed to stand in a fog-box operating at 90% to 100% relative humidity and a temperature of 18°±2° C., and thereafter the sheet was allowed to stand for 7 days under ambient conditions.

The cement sheet was scored to outline strips of dimensions 5.0 cm×1.7 cm×0.3 cm, the strips were separated by breaking on the scored lines, and the strips were then subjected to a 3-point bend test on an Instron machine using a span of 3.2 cm, a depth of 0.3 cm, a width of 1.7 cm, and a crosshead speed of 0.05 cm/min, and the load to failure of the strips was measured.

The flexural strength of the strips were calculated using the following formula:

$$\delta = \frac{1.5\ WL}{d^2w} \times \frac{0.101325}{1.0332}\ \text{MPa}$$

where
  W = load at failure in Kg
  L = span in cm
  d = depth in cm
  w = width in cm
  $\sigma$ = flexural strength The flexural strength of the cementitious product was found to be 61±4 MPa (average of 6 values).

The cement sheet had a porosity of 22% and pores having a maximum dimension exceeding 15 microns in size were 0.5% of the total volume of the product.

By way of comparison the above procedure was repeated in three separate experiments except that the ordinary Portland cement which was used in the cement compositions had been classified into samples having weight average mean particle sizes of respectively 25, 60 and 100 microns. Thus, the cement did not have a multi-modal distribution of particle sizes.

The flexural strengths of strips cut from sheets prepared from the cement compositions (average of 6 values in each case) were respectively 27, 23 and 20 MPa.

EXAMPLE 2

The procedure of Example 1 was repeated except that there was used 80 grams of ordinary Portland cement of size in the range 100 to 120 microns, 20 grams of ordinary Portland cement of size below 10 microns with a peak at 5 microns, and 15 grams of aqueous polyacrylamide gel, and the cement dough was pressed into plate form between sheets of polyethylene terephthalate at a pressure of 5 MPa. It was then allowed to stand in a water bath at 30° C. for 7 days and thereafter was allowed to dry under ambient conditions for 7 days.

The cementitious product was found to have a flexural strength of 60±6 MPa (mean of 5 values) and a proportion of pores of maximum dimension greater than 15 microns of 0.8%.

EXAMPLE 3

The procedure of Example 1 was repeated except that the cement composition was made from 100 grams of Portland cement having a particle size in the range 106 to 150 microns, 10 grams of Portland cement having a weight average mean particle size of 7.5 microns, and 15 grams of aqueous polyacrylamide gel, and the pressure used in the hydraulic press was 1 MPa.

The flexural strength of the cementitious product was 56±0.5 MPa.

EXAMPLE 4

The procedure of Example 3 was repeated except that 70 grams of Portland cement having a particle size in the range 106 to 150 microns and 30 grams of Portland cement having a weight average mean particle size of 7.5 microns were used.

The flexural strength of the cementitious product was 54±3 MPa.

What we claim is:

1. A cement composition which comprises a hydraulic cement and water, the hydraulic cement comprising two or more distinct bands or modes of particle sizes in which the total weight of particles of intermediate size does not exceed 20% of the total weight of the particles in the bands or modes adjacent thereto, and in which the amount of water is not greater than 25% by weight of the hydraulic cement.

2. A cement composition as claimed in claim 1 in which the particle size distribution of the hydraulic cement is bimodal.

3. A cement composition as claimed in claim 2 in which the hydraulic cement comprises a coarse band or mode and a fine band or mode and in which the ratio of the weight average mean particle size of the coarse band or mode (D1) to the weight average mean particle size of the fine band or mode (D2) is at least 2.

4. A cement composition as claim 3 in which in the hydraulic cement the ratio of D1 to D2 is at least 10.

5. A cement composition as claimed in claim 3 in which the hydraulic cement comprises:
  (a) at least 50% by weight of particles of size in the range 60 to 110 microns,
  (b) at least 5% by weight of particles of size in the range 1 to 10 microns, and
  (c) not greater than 20% by weight of particles of size outside the ranges 1 to 10 microns and 60 to 110 microns.

6. A cement composition as claimed in claim 5 in which the hydraulic cement comprises:
  (a) 70% to 90% by weight of particles of size in the range 60 to 110 microns,
  (b) 10% to 30% by weight of particles of size in the range 1 to 10 microns, and p1 (c) not greater than 10% by weight of particles of size outside the ranges 1 to 10 microns and 60 to 110 microns.

7. A cement composition as claimed in claim 5 or 6 in which in the hydraulic cement the fraction (a) comprises particles of size in the range 70 to 90 microns and the fraction (b) comprises particles of size in the range 4 to 8 microns.

8. A cement composition as claimed in claim 1 in which the particle size distribution of the hydraulic cement is trimodal.

9. A cement composition as claimed in claim 8 in which the hydraulic cement comprises particles of a coarse band or mode, particles of an intermediate band or mode, and particles of a fine band or mode in which the ratio of the weight average mean particle size of the coarse band or mode band (D1) to the weight average mean particle size of the intermediate band or mode (D2) is at least 2, and in which the weight average mean particle size of the fine band or mode (D3) is at least 2.

10. A cement composition as claimed in claim 9 in which in the hydraulic cement the ratio of D1 to D2 is at least 10 and in which the ratio of D2 to D3 is at least 10.

11. A cement composition as claimed in claim 10 in which the hydraulic cement comprises:

(a) at least 50% by weight of particles of size in the range 100 to 150 microns, (b) at least 5% by weight of particles of size in the range 7 to 12 microns, and (c) at least 1% by weight of particles of size in the range 0.5 to 2 microns.

12. A cement composition as claimed in claim 11 in which the hydraulic cement comprises:

(a) 70% to 90% by weight of particles of size in the range 100 to 150 microns, (b) 10% to 30% by weight of particles of size in the range 7 to 12 microns, and (c) 3% to 8% of particles of size in the range 0.5 to 2 microns.

13. A cement composition as claimed in claim 2 in which the composition comprises a band or mode of particles of an aggregate.

14. A cement composition as claimed in claim 1 which comprises 7% to 15% of water by weight of the hydraulic cement in the composition.

15. A cement composition as claimed in claim 1 which contains a processing aid which facilitates mixing of the hydraulic cement and water.

16. A cementitious product produced by setting of a cement composition as claimed in claim 1.

* * * * *